W. T. SUTHERLAND.
WRIST PIN WRENCH.
APPLICATION FILED FEB. 23, 1921.

1,435,511.

Patented Nov. 14, 1922.

INVENTOR
William T. Sutherland
BY John A. Naismith
ATTORNEY

Patented Nov. 14, 1922.

1,435,511

UNITED STATES PATENT OFFICE.

WILLIAM T. SUTHERLAND, OF SAN JOSE, CALIFORNIA.

WRIST-PIN WRENCH.

Application filed February 23, 1921. Serial No. 447,201.

*To all whom it may concern:*

Be it known that I, WILLIAM T. SUTHERLAND, a citizen of the United States, and resident of San Jose, in the county of Santa Clara and State of California, have invented certain new and useful Improvements in Wrist-Pin Wrenches, of which the following is a specification.

My invention relates to a form of wrenches designed particularly for use in adjusting the wrist pins in piston heads.

In fitting one hollow cylindrical element within another, especially where a close fit is desired as in a wrist pin adjustment, the inner element must be manipulated by twisting until it has been worked into the desired position. When the pin is of the type provided with a groove in one side and at its center, then the adjustment is not only longitudinal but the pin must be so turned into its final position as to provide clearance for the screw binding the piston rod to the wrist pin.

It is the object of the present invention to provide a wrench and holder for wrist pins and similar elements of various sizes whereby the same may be rigidly held during the fitting or removal thereof, facilitating the work and eliminating the many annoyances commonly attending adjustments of this nature.

Figure 1:
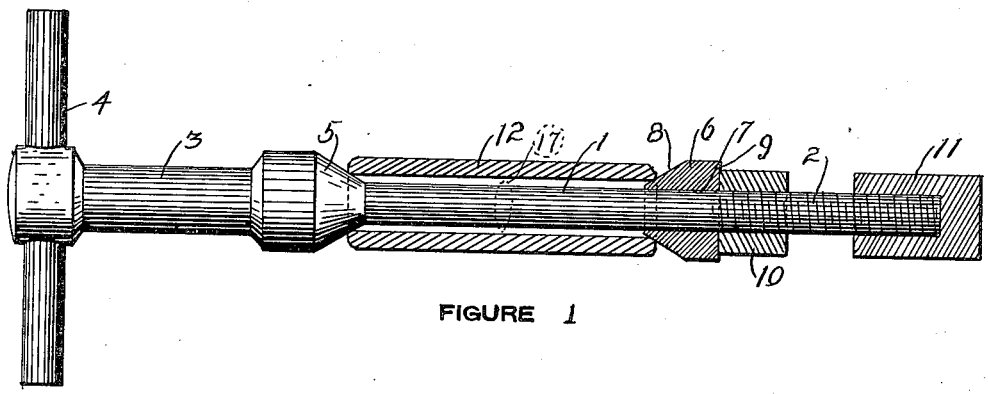
Figure 1 is a side elevation of the device in operative relation to a wrist pin, partly in section.

Referring more particularly to the drawing, 1 indicates a bar of suitable dimensions threaded at one end as 2 and provided at the other end with a shank 3 and handle 4. The shank 3 is bevelled as at 5 at the point where it joins bar 1. At 6 is shown an element adapted to slidably engage bar 1 as at 7 and having one cone shaped end as 8 and a flat end 9. At 10 is a nut engaging the threaded end 2 of bar 1, and at 11 is a terminal nut engaging the extreme end of bar 1 as shown.

In its practical application a small wrist pin 12 may be slipped on to bar 1 as shown, after which the cone shaped member 6 is slipped into place and nut 10 screwed up tightly against the same. The tightening of nut 10 forces the cone shaped portion 8 of element 6 into the adjacent end of pin 12, the two cone shaped surfaces 5 and 8 being in axial alignment with each other the pin 12 is forced into and rigidly held in axial alignment with bar 1. By grasping the handle 4 the pin may be manipulated in any direction. If additional force is required to remove the pin from a given position, blows may be applied to the terminal nut 11 without in any way loosening the parts 6 and 10 and without injuring the threads on bar 1.

Figure 2:
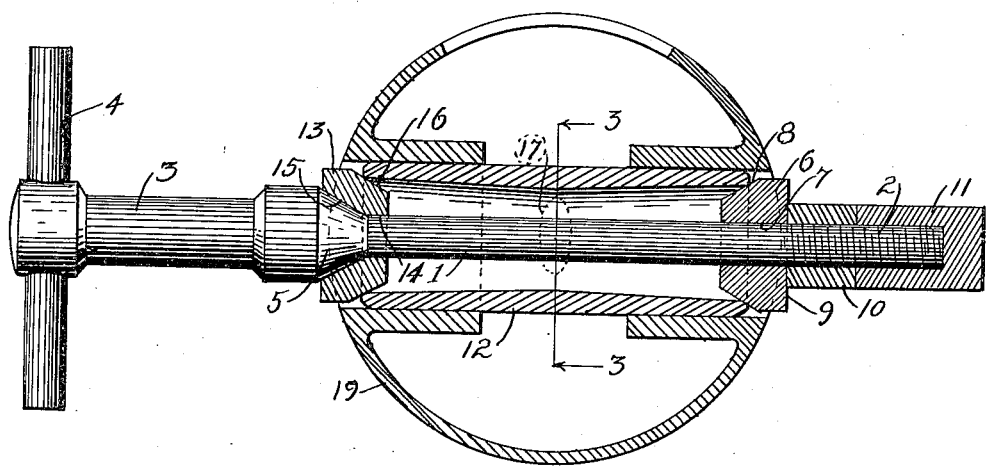
Figure 2 is a side elevation of the device in operative relation to a wrist pin and piston, partly in section.
Figure 3:
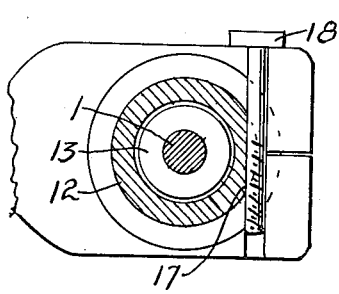
Figure 3 is a section on line 3—3 of Figure 2.

The same structure is shown in Figure 2 but since a larger wrist pin is shown a larger element 17 is provided having a bore formed therein as at 14 to slidably engage bar 1 and having a cone shaped seat 15 formed in one end adapted to engage the cone shaped surface 5 on shank 3. This element 13 also has a cone shaped surface at 16 to correspond with the notch in pin 12 to permit the placing of the screw 18.

In placing the pin 12 in position in piston 19 it must be so arranged that the notch 17 will be in exactly the right position with relation to screw 18. By rigidly mounting the pin 12 in the holder as described this result may be accomplished in a minimum amount of time and with a minimum amount of labor.

While I have herein shown and described one specific embodiment of my invention it is to be understood that changes in form and construction may be made within the scope of the appended claims.

I claim:

1. A wrist pin wrench comprising a supporting rod threaded at one end thereof, a handle mounted upon the other end thereof, said rod having a wrist pin engaging surface formed thereon integrally therewith and directed toward said threaded end, an element slidably mounted upon said rod and adapted to engage said wrist pin engaging surface and having a wrist pin engaging surface formed thereon, a second element adjustably mountable upon said rod and having a wrist pin engaging surface arranged in opposed relation to the corresponding surface of said last mentioned element, and a lock nut operatively mounted upon the threaded end of said rod.

2. A wrist pin wrench comprising a supporting rod threaded at one end thereof, a handle mounted upon the other end thereof, said rod having a conical surface arranged thereon in concentric relation to said rod and directed toward the threaded end thereof, and an element slidably mounted on the threaded end of said rod and provided with a conical surface in opposed relation to said first mentioned conical surface, and means engaging the threaded end of said rod for locking said slidable element in a predetermined position, and a terminal element mounted upon the threaded end portion of said rod to contact with the extreme end thereof.

WILLIAM T. SUTHERLAND.